United States Patent
Closmann et al.

(10) Patent No.: US 9,533,253 B2
(45) Date of Patent: Jan. 3, 2017

(54) AMINE SOLVENT BLENDS

(71) Applicant: PHILLIPS 66 COMPANY, Houston, TX (US)

(72) Inventors: Frederick Bynum Closmann, Bartlesville, OK (US); David Hamilton Van Wagener, Bartlesville, OK (US); Clint Aichele, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 64 days.

(21) Appl. No.: 14/730,350

(22) Filed: Jun. 4, 2015

(65) Prior Publication Data

US 2015/0352484 A1 Dec. 10, 2015

Related U.S. Application Data

(60) Provisional application No. 62/008,251, filed on Jun. 5, 2014.

(51) Int. Cl.
*B01D 53/14* (2006.01)
*C09K 3/00* (2006.01)

(52) U.S. Cl.
CPC ....... *B01D 53/1493* (2013.01); *B01D 53/1475* (2013.01); *C09K 3/00* (2013.01); *B01D 2252/202* (2013.01); *B01D 2252/204* (2013.01); *B01D 2252/20447* (2013.01); *B01D 2252/20489* (2013.01); *B01D 2257/504* (2013.01); *Y02C 10/06* (2013.01)

(58) Field of Classification Search
None
See application file for complete search history.

(56) References Cited

U.S. PATENT DOCUMENTS

| | | | |
|---|---|---|---|
| 4,035,196 A | 7/1977 | Remer | |
| 7,754,102 B2 * | 7/2010 | Zhang | B01D 53/1475 252/184 |
| 8,419,831 B2 * | 4/2013 | Shimizu | B01D 53/1475 423/228 |
| 2009/0101868 A1 * | 4/2009 | Zhang | B01D 53/1475 252/184 |
| 2009/0199713 A1 | 8/2009 | Asprion et al. | |
| 2010/0126348 A1 * | 5/2010 | Shimizu | B01D 53/1475 95/183 |

(Continued)

FOREIGN PATENT DOCUMENTS

| | | |
|---|---|---|
| WO | 2013016063 | 1/2013 |
| WO | 2014004019 | 1/2014 |

OTHER PUBLICATIONS

Ali Haghtalab, Amin Izadi & Abolfazl Shojaeian, "High Pressure Measurement and Thermodynamic Modeling the Solubility of H2S in the amino-2-methyl-1-propanol + piperazine systems", Fluid Phase Equilibria 363, 2014, pp. 263-275.

(Continued)

*Primary Examiner* — Joseph D Anthony
(74) *Attorney, Agent, or Firm* — Phillips 66 Company

(57) ABSTRACT

A process of mixing methyldiethanolamine to water to produce a first mixture. 2-amino-2-methyl-1-propanol is added to the first mixture to form a second mixture. The second mixture is then heated while mixing to form a third mixture. Piperazine is then added to the third mixture to form a solvent.

18 Claims, 2 Drawing Sheets

(56) References Cited

U.S. PATENT DOCUMENTS

| | | | |
|---|---|---|---|
| 2010/0203619 A1* | 8/2010 | Fradette | B01D 53/1475 435/266 |
| 2010/0288125 A1 | 11/2010 | Vorberg et al. | |
| 2011/0104779 A1* | 5/2011 | Borchert | B01D 53/84 435/174 |
| 2012/0279393 A1 | 11/2012 | Menzel et al. | |
| 2013/0008310 A1* | 1/2013 | Aroonwilas | B01D 19/0015 95/232 |
| 2014/0123851 A1* | 5/2014 | Jamtvedt | B01D 53/18 95/149 |

OTHER PUBLICATIONS

PCT Notification of Transmittal of the International Search Report and The Written Opinion of the International Searching Authority, or the Declaration, International Filing Date: Jun. 5, 2015, International Application No. PCT/US15/34342, Date of Mailing: Aug. 25, 2015, 17 pages.

* cited by examiner

| Run | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Lean Loading | mol/mol | 0.353 | 0.352 | 0.351 | 0.352 | 0.353 | 0.359 | 0.353 | 0.356 | 0.356 | 0.357 | 0.355 | 0.292 | 0.302 | 0.254 | 0.247 | 0.295 | 0.256 |
| Rich Loading | mol/mol | 0.464 | 0.466 | 0.463 | 0.462 | 0.452 | 0.457 | 0.459 | 0.459 | 0.469 | 0.463 | 0.466 | 0.445 | 0.478 | 0.485 | 0.481 | 0.477 | 0.478 |
| Flue Gas Type | | Conv. | Conv. | Conv. | Conv. | Conv. | Conv. | Conv. | Conv. | Conv. | Conv. | Conv. | Conv. | Conv. | Conv. | FCC | FCC | FCC |
| CO2 Removal | % | 92.4 | 91.9 | 91 | 92.9 | 91 | 87.2 | 91.3 | 90.5 | 90.7 | 91.9 | 90.8 | 91.2 | 88 | 89.1 | 90.4 | 89.7 | 88.7 |
| Reboiler Temperature | °F | 252.5 | 251.9 | 252.3 | 252.1 | 252.1 | 251.2 | 253.7 | 252.9 | 253.3 | 253.3 | 253.5 | 235.6 | 234.6 | 236.8 | 237.6 | 236.4 | 237.5 |

| Run | | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|
| Lean Loading | mol/mol | 0.346 | 0.356 | 0.314 | 0.167 | 0.15 | 0.147 | 0.153 | 0.151 | 0.15 | 0.147 | 0.142 | 0.147 | 0.147 | 0.15 | 0.19 | 0.092 | 0.067 |
| Rich Loading | mol/mol | 0.474 | 0.489 | 0.497 | 0.291 | 0.275 | 0.272 | 0.276 | 0.278 | 0.274 | 0.275 | 0.271 | 0.268 | 0.276 | 0.275 | 0.275 | 0.273 | 0.283 |
| Flue Gas Type | | FCC | FCC | FCC | Conv. | Conv. | Conv. | Conv. | Conv. | Conv. | Conv. | Conv. | Conv. | Conv. | Conv. | Conv. | Conv. | Conv. |
| CO2 Removal | % | 89.5 | 77.2 | 79.4 | 87.3 | 90.3 | 90.1 | 92.5 | 89.3 | 90.6 | 89.3 | 91.2 | 91.3 | 90.1 | 90.3 | 90.5 | 90.4 | 89.7 |
| Reboiler Temperature | °F | 233.5 | 232.9 | 235.5 | 227.4 | 229.9 | 229.9 | 230.6 | 230.1 | 229.9 | 230.2 | 230.3 | 230.5 | 230.4 | 230.3 | 233.6 | 234.8 | 236.6 |

| Run | | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|
| Lean Loading | mol/mol | 0.048 | 0.044 | 0.101 | 0.129 | 0.123 | 0.094 | 0.147 | 0.093 | 0.065 | 0.048 | 0.024 | 0.036 | 0.046 | 0.103 | 0.1 | 0.053 | 0.165 |
| Rich Loading | mol/mol | 0.288 | 0.26 | 0.257 | 0.272 | 0.278 | 0.282 | 0.29 | 0.278 | 0.284 | 0.29 | 0.301 | 0.301 | 0.319 | 0.302 | 0.277 | 0.292 | 0.275 |
| Flue Gas Type | | Conv. | FCC | FCC | FCC | FCC | FCC | FCC | FCC | FCC | FCC | FCC | FCC | FCC | FCC | Conv. | Conv. | Conv. |
| CO2 Removal | % | 90.2 | 88.9 | 89 | 90.5 | 91 | 90.1 | 90.2 | 91.3 | 89.8 | 90 | 90.1 | 90 | 79.8 | 78.4 | 90 | 89.5 | 88.9 |
| Reboiler Temperature | °F | 237.6 | 238.8 | 234.7 | 232.2 | 232.7 | 235 | 230.8 | 235 | 236.4 | 237.8 | 238.7 | 239.7 | 237.3 | 233.7 | 244.2 | 246.9 | 230.2 |

| Run | | 52 |
|---|---|---|
| Lean Loading | mol/mol | 0.162 |
| Rich Loading | mol/mol | 0.281 |
| Flue Gas Type | | FCC |
| CO2 Removal | % | 90.7 |
| Reboiler Temperature | °F | 231.5 |

FIGURE 2

AMINE SOLVENT BLENDS

CROSS-REFERENCE TO RELATED APPLICATIONS

This application is a Non-Provisional application which claims the benefit of and priority to U.S. Provisional Application Ser. No. 62/008,251 filed Jun. 5, 2014, entitled "Novel Amine Solvent Blends," which is hereby incorporated by reference.

STATEMENT REGARDING FEDERALLY SPONSORED RESEARCH OR DEVELOPMENT

None.

FIELD OF THE INVENTION

This invention relates to a novel amine solvent blend.

BACKGROUND OF THE INVENTION

There is growing pressure for producers of greenhouse gases to dramatically reduce their atmospheric emissions. Of particular concern is the emission of carbon dioxide ($CO_2$) into the atmosphere. One method of reducing atmospheric $CO_2$ emissions is through its capture at a point source and subsequent storage in geological or other reservoirs.

The process for capturing $CO_2$ from power station and other combustion device flue gases is termed post combustion capture (PCC). The most mature commercially available technology for PCC is solvent-based chemical absorption/release of $CO_2$. When the widespread rollout of PCC technology is realized, enormous quantities of solvent such as ammonia and amine will be required. To put this in perspective, a typical 2.4 GW generator burning pulverized black coal produces approx. 30-50 tons $CO_2$/min, or 680 kmol/min. The potential environmental impacts of solvents and solvent degradation products (produced via oxidative and thermal processes) needs consideration, especially as release to the local environment through solvent slippage at this scale may be inevitable.

Chemical absorption of $CO_2$ may be performed with amine based processes and alkaline salt-based processes. In such processes, the absorbing medium reacts with the dissolved $CO_2$. Amines may be primary, secondary, and tertiary. These groups differ in their reaction rate, absorption capacity, corrosion, degradation, etc. In alkaline salt-based processes, the most popular absorption solutions have been sodium and potassium carbonate. As compared to amines, alkaline salt solutions have lower reaction rates with $CO_2$.

With primary and secondary alkanolamines the nitrogen atom reacts rapidly and directly with carbon dioxide to bring the carbon dioxide into solution according to the following reaction sequence:

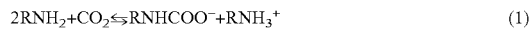
$$2RNH_2 + CO_2 \leftrightarrows RNHCOO^- + RNH_3^+ \quad (1)$$

where R is an alkanol group. The carbamate reaction product ($RNHCOO^-$) must be hydrolysed to bicarbonate ($HCO_3^-$) according to the following reaction:

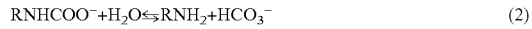
$$RNHCOO^- + H_2O \leftrightarrows RNH_2 + HCO_3^- \quad (2)$$

In forming a carbamate, primary and secondary alkanolamine undergo a fast direct reaction with carbon dioxide which makes the rate of carbon dioxide absorption rapid. In the case of primary and secondary alkanolamines, formation of carbamate (reaction 1) is the main reaction while hydrolysis of carbamate (reaction 2) is a secondary consideration. This is due to stability of the carbamate compound, which is caused by unrestricted rotation of the aliphatic carbon atom around the aminocarbamate group.

Unlike primary and secondary alkanolamines, tertiary alkanolamines cannot react directly with carbon dioxide, because their amine reaction site is fully substituted with substituent groups. Triethanolamine (($HOCH_2CH_2)_3N$) and methyldiethanolamine (($HOCH_2CH_2)_2NCH_3$) are examples of tertiary alkanolamines which have been used to absorb carbon dioxide from industrial gas mixtures. Molecular structures of sterically hindered amines are generally similar to those of non-hindered amines, except sterically hindered amines have an amino group attached to a bulky alkyl group. For example, 2-amino-2-methyl-1-propanol ($NH_2$—$C(CH_3)_2CH_2OH$). Instead, carbon dioxide is absorbed into solution by the following slow reaction with water to form bicarbonate.

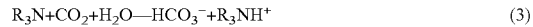
$$R_3N + CO_2 + H_2O \leftrightarrow HCO_3^- + R_3NH^+ \quad (3)$$

In order to increase the rate of $CO_2$ absorption, especially for aqueous tertiary alkanolamine solutions, promoters have been added to the solutions. Promoters such as piperazine, N,N-diethyl hydroxylamine or aminoethylethanolamine, is are added to an absorption solution (chemical or physical solvent). Yoshida et al. (U.S. Pat. No. 6,036,931) used various aminoalkylols in combination with either piperidine, piperazine, morpholine, glycine, 2-methylaminoethanol, 2-piperidineethanol or 2-ethylaminoethanol. EP 0879631 discloses that a specific piperazine derivative for liquid absorbent is remarkably effective for the removal of $CO_2$ from combustion gases. Peytavy et al. (U.S. Pat. No. 6,290, 754) used methyldiethanolamine with an activator of the general formula $H_2N$—$C_nH_n$—$NH$—$CH_2$—$CH_2OH$, where n represents an integer ranging from 1 to 4. U.S. Pat. No. 4,336,233 relates to a process for removing $CO_2$ from gases by washing the gases with absorbents containing piperazine as an accelerator. Nieh (U.S. Pat. No. 4,696,803) relied on aqueous solution of N-methyldiethanolamine and N,N-diethyl hydroxylamine counter currently contacted with gases to remove $CO_2$ or other acid gases. Kubek et al (U.S. Pat. No. 4,814,104) found that the absorption of carbon dioxide from gas mixtures with aqueous absorbent solutions of tertiary alkanolamines is improved by incorporating at least one alkyleneamine promoter in the solution.

U.S. Pat. Nos. 8,609,049, 8,273,155 and 8,192,531 attempt to utilize solvent blends to increase the rate of $CO_2$ absorption. U.S. Pat. Nos. 8,609,049, 8,273,155 and 8,192, 531 attempt to overcome these problems by using catalysts and additional promoters such as carbonic anhydrase and ammonia. Use of an enzyme in a $CO_2$ absorber situation requires additional technologies and equipment to be added to refineries.

There exists a need to effectively remove $CO_2$ from flue gases through use of a novel amine solvent blend that does not utilize additional catalysts and promoters.

BRIEF SUMMARY OF THE DISCLOSURE

A process of mixing methyldiethanolamine to water to produce a first mixture. 2-amino-2-methyl-1-propanol is added to the first mixture to form a second mixture. The second mixture is then heated while mixing to form a third mixture. Piperazine is then added to the third mixture to form a solvent.

A process of mixing 99%+ purity methyldiethanolamine to water to produce a first mixture between 1.5 to 2.5 molal.

95%+ purity 2-amino-2-methyl-1-propanol is added to the first mixture to form a second mixture containing between 4 to 6 molal 2-amino-2-methyl-1-propanol. The second mixture is then heated to at least 40° C. while mixing to form a third mixture. 99%+ purity piperazine is then added to the third mixture to form a solvent containing between 1.2 to 1.7 molal piperazine. The solution is then circulated at a temperature greater than 35° C. to complete solubilization of the solution. In this process a catalyst is not used and solids formation does not occur A solvent consisting essentially of from about 1.5 to about 2.5 molal methyldiethanolamine; from about 4 to about 6 molal 2-amino-2-methyl-1-propanol; from about 1.2 to about 1.7 molal piperazine and water.

BRIEF DESCRIPTION OF THE DRAWINGS

A more complete understanding of the present invention and benefits thereof may be acquired by referring to the follow description taken in conjunction with the accompanying drawings in which:

FIG. 2 is a table depicting tests run on various solvents.

DETAILED DESCRIPTION

Figure 1:
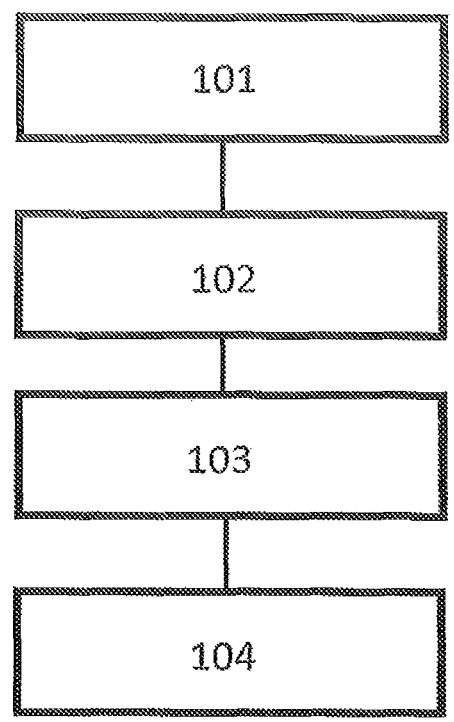
FIG. 1 is a depiction of a flow chart of the process.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

As shown in FIG. 1, the process discloses mixing methyldiethanolamine to water to produce a first mixture 101. 2-amino-2-methyl-1-propanol is added to the first mixture to form a second mixture 102. The second mixture is then heated while mixing to form a third mixture 103. Piperazine is then added to the third mixture to form a solvent 104.

In one embodiment the solution is used for $CO_2$ capture. In another embodiment, the solvent is a liquid with either little or no solids formation.

The solvent can be formulated using the components with the following molality (moles component/kg water) ranges:

| Component | Broad Range | Narrow Range |
| --- | --- | --- |
| methyldiethanolamine | 1.3 to 2.8 molal | 1.5 to 2.5 molal |
| 2-amino-2-methyl-1-propanol | 3 to 7 molal | 4 to 6 molal |
| piperazine | 1.2 to 1.7 molal | 1.4 to 1.6 molal |

The solvent can also be formulated using the components with the following purity ranges:

| Component | Broad Range | Narrow Range |
| --- | --- | --- |
| methyldiethanolamine | greater than 95% | greater than 99% |
| 2-amino-2-methyl-1-propanol | greater than 90% | greater than 95% |
| piperazine | greater than 95% | greater than 99% |

In one embodiment, the solvent can be created using the following sequence: (1) adding methyldiethanolamine to water and stirring or circulating solution to achieve full mixing, (2) adding 2-amino-2-methyl-1-propanol to the formulation and stirring or circulating solution to achieve full mixing, (3) uniformly heating the formulation to at least 40° C.+ while mixing, and (4) adding piperazine to the formulation and stirring or circulating solution to achieve full mixing.

Following the addition of the piperazine, the solvent can be stirred or circulated and maintained at a temperature of 100+° F. to ensure complete solubilization of the piperazine. When mixed in the sequence described, the solvent can be formulated and then stored at ambient temperature (above 50° F.) with dissolution of all amine components without the formation of solids. Once the solvent has contacted flue gas or any gas stream laden with $CO_2$ and the solvent becomes loaded with $CO_2$, the solvent can be stored over a wider range of temperatures (below 10° C.).

The following examples of certain embodiments of the invention are given. Each example is provided by way of explanation of the invention, one of many embodiments of the invention, and the following examples should not be read to limit, or define, the scope of the invention.

Examples

Stripper Column Configuration

A typical carbon steel stripping column was used with a 16.8-inch inner diameter and approximately 35 feet tall. The stripping column was filled with two 10-foot beds of stainless steel structured packing. The stripping system is also controlled by a process control system. Solvent exits the cross heat exchanger and is piped to the top of the stripper where it undergoes a flash prior to entering the stripper. In general, the cold-side temperature approach is consistently in the range of 4-7° F. A gas/liquid separator at the top of the tower allows the unflashed solvent to flow through a trough drip tube liquid distributor, while the flashed $CO_2$ and rising steam exit the top of the stripper and enter a chilled water condenser. The condensed water is returned to the absorber feed tank via the cool lean amine return line. The non-condensed $CO_2$ is fed to a horizontal accumulator, which assists in controlling the stripper pressure.

The liquid leaving the trough drip tube distributor falls through the packing as a wetted film and contacts the rising vapor. A chimney tray collects the liquid at the bottom of this section of packing and redistributes it through an orifice pipe distributor into the lower bed. The redistributed liquid falls down as a wetted film through the second bed of packing contacting the rising vapor. The liquid enters the sump of the column which is connected to a kettle type reboiler. Saturated steam at 150 psig is fed to the tube side of the reboiler to generate water vapor within the stripper. The steam applies heat to the solvent to reverse the exothermic $CO_2$ absorption reaction. The lean and rich amine flows are measured with mass flow meters with density and temperature readout capabilities. The lean solvent exiting the stripper is cooled in the plate-and-frame cross exchanger and cooled further using a shell and tube heat exchanger before entering the lean amine feed tank.

The overhead vapor leaving the stripper is condensed using a stainless steel shell and tube chilled water heat exchanger. The condensed water and residual solvent are sent to a carbon steel reflux accumulator and returned to the absorber feed tank in batch operation. $CO_2$ exits the vent from the condenser and reflux accumulator, and it is fed to a horizontal accumulator. $CO_2$ exits the horizontal accumulator and is fed to the discharge of the air blower for reuse.

Make-up $CO_2$ is transferred from a $CO_2$ storage tank to the discharge of the blower. Make-up $CO_2$ is metered using a mass flow meter and control valve. The desired $CO_2$ concentration in the synthetic flue gas is controlled by manually adjusting the control valve. At high $CO_2$ removals (e.g. 90%), the pressure regulator off the tank is adjusted to raise the pressure of the make-up stream. A flue gas flow rate of 350 standard cubic feet/minute (scfm) was utilized in every run during these examples.

Solvent Properties

Six different properties were tested on the novel solvent, and conventional 7 molal monoethanolamine and 8 molal piperzine.

Density

Density measurements were made over a range of $CO_2$ loadings (0.1 to 0.5 mol $CO_2$/mol alkalinity) for several solvents at 20° C. The density of the novel solvent was similar to that of 30% wt monoethanolamine (~1.05 g/mL at α=0.2 mol $CO_2$/mol alkalinity), as shown below.

TABLE 1

| Loading | Density (g/ml) at T (° C.) | | |
|---|---|---|---|
| (mol/mol) | 40° C. | 60° C. | 80° C. |
| 0 | 1.0031 | 0.9883 | 0.9724 |
| 0.1 | 1.0255 | 1.0113 | 0.9961 |
| 0.2 | 1.0473 | 1.0334 | 1.0186 |
| 0.3 | 1.071 | 1.0571 | 1.0423 |
| 0.4 | 1.0916 | 1.0777 | — |

A summary of some of these tests can be shown on Table 1 and Table 4 below. Viscosity The viscosity of the novel solvent was similar to that of other concentrated amines including 8 m piperzine and the 7 m methyldiethanolamine/2 m piperzine blend. At a loading of 0.2 mol $CO_2$/mol alkalinity and 40° C., the solvent's viscosity was ~7.4 cP. As with all other solvents, viscosity obeyed an increasing trend as loading was increased, as shown below.

TABLE 2

| Loading | Viscosity (cP) at T (° C.) | | |
|---|---|---|---|
| (mol/mol) | 40° C. | 60° C. | 80° C. |
| 0.16 | 6.9 | 3.6 | 2.3 |
| 0.2 | 8.6 | 4.4 | 2.7 |
| 0.26 | 8.2 | 4.3 | 2.6 |
| 0.3 | 8.9 | 4.6 | 2.8 |
| 0.35 | 9.4 | 4.9 | 3.0 |
| 0.4 | 10.5 | 5.4 | 3.3 |
| 0.44 | 10.9 | 6.3 | 3.4 |
| 0.45 | 10.9 | 5.6 | 3.6 |
| 0.5 | 12.7 | 7.8 | 3.5 |

A summary of the results can be shown on Table 2 and Table 4 below.

Liquid-side Mass Transfer Coefficient

Liquid-side mass transfer coefficient ($k_g'$) is defined in terms of a gas-side driving force. $k_g'$ measurements are used to understand the relative mass transfer rates of $CO_2$ into various solvents, and allow screening of solvents for their mass transfer rates in terms of a lumped parameter ($k_g'$), which takes into account each amine's $CO_2$ reaction rate, $CO_2$ diffusivity, and loaded amine viscosity.

TABLE 3

| Loading (mol/mol) | T (° C.) | $P_{CO2}$ (kPa) | $k_g'$ (mol s$^{-1}$ m$^{-2}$ Pa$^{-1}$) |
|---|---|---|---|
| 0.086 | 40 | 0.022 | 4.77E−06 |
| 0.151 | 40 | 0.083 | 3.03E−06 |
| 0.16 | 40 | 0.24 | 2.57E−06 |
| 0.2 | 40 | 0.61 | 2.12E−06 |
| 0.26 | 40 | 1 | 1.40E−06 |
| 0.3 | 40 | 2.25 | 1.10E−06 |
| 0.35 | 40 | 3.35 | 8.29E−07 |
| 0.4 | 40 | 5.9 | 5.04E−07 |
| 0.44 | 40 | 7.2 | 4.42E−07 |
| 0.45 | 40 | 10.5 | 3.53E−07 |
| 0.5 | 40 | 15.5 | 2.62E−07 |
| 0.16 | 50 | 0.92 | 3.09E−06 |
| 0.2 | 50 | 1.69 | 2.33E−06 |
| 0.26 | 50 | 3.45 | 1.56E−06 |
| 0.3 | 50 | 6.15 | 9.98E−07 |
| 0.35 | 50 | 9.94 | 7.22E−07 |
| 0.4 | 50 | 15.55 | 4.62E−07 |
| 0.45 | 50 | 34.3 | 2.66E−07 |
| 0.5 | 50 | 54.2 | 1.85E−07 |
| 0.16 | 60 | 3 | 2.82E−06 |
| 0.2 | 60 | 4.7 | 2.51E−06 |
| 0.26 | 60 | 10.1 | 1.33E−06 |
| 0.3 | 60 | 15.7 | 9.70E−07 |
| 0.35 | 60 | 24.6 | 6.15E−07 |
| 0.4 | 60 | 31.85 | 5.57E−07 |
| 0.45 | 60 | 57.2 | 3.33E−07 |

The measured $k_g'$ values at 40° C., 50° C. and 60° C. for some of the tested solvents are listed in Table 3 and Table 4 below.

$CO_2$ Carrying Capacity

Viscosity effect on $CO_2$ carrying capacity was assessed with a parameter called viscosity-normalized capacity (Č), defined as $Č=C/\mu^{0.25}$. This relationship allows for the correlation of solvent capacity to viscosity. When subjected to this analysis, the novel solvent had the second highest Č (0.62 mol $CO_2$/kg-cP$^{0.25}$) of ten different solvent and solvent blends analyzed. The measured Č values for some of the tested solvents are listed in Table 4.

Partial Pressure

Equilibrium $CO_2$ partial pressure (P*CO2) for several different solvents were also tested. The measured P*CO2 values for some of the tested solvents are listed in Table 1.

Oxidation Resistance

An oxidation screening experiment with the novel solvent was conducted at 55° C., and a formate production rate of 0.003 mmol/kg-hr was measured. The formate production rate measured in comparable experiments with 30% wt monoethanolamine was 0.121 mmol/kg-hr, confirming the relative oxidation resistance of the novel solvent compared to monoethanolamine. The measured formate production rates for the tested solvents are listed in Table 4.

TABLE 4

| | Solvent | | |
|---|---|---|---|
| Parameter | Novel Solvent | 30 wt % monoethanolamine | 8 m piperazine |
| Density (40° C.) (g/mL) | 1.05 | 1.045 | 1.15 |
| Viscosity (40° C.) (cP) | 7.4 | 2.5 | 11.3 |
| kg' (40° C.) (mols $CO_2$/s-Pa-m$^2$) | 8.7 × 10$^{-7}$ | 7.3 × 10$^{-7}$ | 1.2 × 10$^{-6}$ |
| C (mols CO2/kg solv-cP0.25) | 0.62 | 0.45 | 0.47 |

TABLE 4-continued

| Parameter | Solvent | | |
|---|---|---|---|
| | Novel Solvent | 30 wt % monoethanolamine | 8 m piperazine |
| P*CO2 (40° C. & α = 0.2) (Pa) | 320 | 45 | 85 |
| Formate prod rate (mmol/kg$^{-hr}$) | 0.003 | 0.121 | 0.006 |

Degradation:

Monoethanolamine and the novel solvent were tested for degradation rates using both synthetic fluidized catalytic cracking unit flue gas (FCC) and conventional coal-fired power plant flue gas (cony). Both solvents were tested for approximately 150 hours. Formation rates of key degradation products are listed in Table 5.

TABLE 5

| Product rate/Conditions | Monoethanolamine (mmol/kg-hr) | Novel Solvent (mmol/kg-hr) |
|---|---|---|
| Formate (conventional flue gas) | 0.0275 (118° C.) | 0.0030 (110° C.) |
| Formate (FCC flue gas) | 0.0029 (118° C.) | 0.0027 (110° C.) |
| Formyl amides | 0.038 (118° C.) | 0.0688, conv/–0.042, FCC (110° C.) |
| Amino acids | 0.0581 (hydroxyethyl glycine 118° C./conv) | 0.0287 (N-(2-hydroxy-1, 1-dimethylethyl)-glycine 110° C., conv) |

Test Runs

FIG. 2 depicts the results of different runs conducted on monoethanolamine and the novel solvent on both synthetic fluidized catalytic cracking unit flue gas (FCC) and conventional coal-fired power plant flue gas (conv).

Runs 1-20 were conducted with monoethanolamine while runs 21-52 were conducted with the novel solvent. Lean loading describes the amount of content of acid gas in the solvent on top of the absorber. Rich loading describes the amount of acid gas in the solvent at the bottom of the absorber. Reboiler temperature can be used as a means to compare the energy efficiency of the solvent.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process comprising:
   mixing methyldiethanolamine to water to produce a first mixture;
   adding 2-amino-2-methyl-1-propanol to the first mixture to form a second mixture;
   heating the second mixture while mixing to form a third mixture; and
   adding piperazine to the third mixture to form a solvent.

2. The process of claim 1, wherein the purity of the methyldiethanolamine is greater than 95%.

3. The process of claim 1, wherein the purity of the 2-amino-2-methyl-1-propanol is greater than 90%.

4. The process of claim 1, wherein the purity of the piperazine is greater than 95%.

5. The process of claim 1, wherein the second mixture is heated to at least 40° C.

6. The process of claim 1, wherein the solvent contains from about 1.3 to 2.8 molal methyldiethanolamine.

7. The process of claim 1, wherein the solvent contains from about 3 to 7 molal 2-amino-2-methyl-1-propanol.

8. The process of claim 1, wherein the solvent contains from about 1.2 to 1.7 molal piperazine.

9. The process of claim 1, wherein the solvent is used as a scrubbing solvent for $CO_2$.

10. The process of claim 1, wherein the formation of the first mixture and the second mixture occurs at standard temperature and pressure.

11. The process of claim 1, wherein the solvent is circulated at a temperature greater than 35° C. to complete solubilization of the solvent.

12. The process of claim 1, wherein the solvent has no solids formations.

13. The process of claim 1, wherein the solvent has a formate degradation rate of less than 0.01 mmol/kg-hr at 110° C. with conventional flue gas.

14. The process of claim 1, wherein the process does not use carbonic anhydrase.

15. The process of claim 1, wherein the process does not use ammonia.

16. A process comprising:
   mixing 99%+purity methyldiethanolamine to water to produce a first mixture from about 1.5 to about 2.5 molal;
   adding 95%+purity 2-amino-2-methyl-1-propanol to the first mixture to form a second mixture containing from about 4 to about 6 molal 2-amino-2-methyl-1-propanol; heating the second mixture to at least 40° C. while mixing to form a third mixture; adding 99%+purity piperazine to the third mixture to form a solvent containing from about 1.2 to about 1.7 molal piperazine;
   circulating the solvent at a temperature greater than 35° C. to complete solubilization of the solvent; and
   wherein a catalyst is not used in the process and solids formation does not occur.

17. A solvent consisting essentially of:
   from about 1.5 to about 2.5 molal methyldiethanolamine;
   from about 4 to about 6 molal 2-amino-2-methyl-1-propanol;
   from about 1.2 to about 1.7 molal piperazine; and
   water.

18. The solvent of claim 17, wherein the solvent does not contain carbonic anhydrase or ammonia.

* * * * *